United States Patent [19]

Schweikert et al.

[11] Patent Number: 5,350,773
[45] Date of Patent: Sep. 27, 1994

[54] STABLE, LIQUID PRODUCTS CONTAINING FAT-SOLUBLE SUBSTANCES

[75] Inventors: Loni Schweikert, Ludwigshafen; Clemens Sambale, Boehl-Iggelheim, both of Fed. Rep. of Germany

[73] Assignee: BASF Aktiengesellschaft, Ludwigshafen, Fed. Rep. of Germany

[21] Appl. No.: 2,038

[22] Filed: Jan. 8, 1993

[30] Foreign Application Priority Data

Jan. 14, 1992 [DE] Fed. Rep. of Germany ....... 4200728

[51] Int. Cl.$^5$ ................. A61K 31/015; A61K 31/59; A61K 31/595; A61K 31/355; A61K 31/34; A61K 31/22; A61K 31/12; A61K 31/07
[52] U.S. Cl. ............................ 514/763; 514/167; 514/168; 514/458; 514/474; 514/549; 514/681; 514/725; 514/943
[58] Field of Search ............... 514/167, 458, 725, 681, 514/474, 785, 943, 763, 168, 549

[56] References Cited

U.S. PATENT DOCUMENTS

| | | | |
|---|---|---|---|
| 2,628,930 | 2/1953 | Zentner | 514/458 |
| 3,384,545 | 5/1968 | Aiello et al. | 514/975 |
| 4,844,934 | 7/1989 | Lueddecke et al. | 426/540 |

FOREIGN PATENT DOCUMENTS

| | | |
|---|---|---|
| 361928 | 4/1990 | European Pat. Off. . |
| 2363534 | 5/1973 | Fed. Rep. of Germany . |
| 0441294 | 1/1969 | Japan . |
| 4523634 | 8/1970 | Japan . |
| 2190822 | 12/1987 | United Kingdom . |

OTHER PUBLICATIONS

*Patent Abstracts of Japan*, vol. 7, No. 235 (C-191), Oct. 19, 1983.
Database WPIL, Derwent Publications Ltd., AN 89-230828. (1989).
*Patent Abstracts of Japan*, vol. 6, No. 169 (C-122), Sep. 2, 1982.
Derwent Abstract of JP 61 260 860 (1986).
Chem Abstract of JP 47 25 220 (1972), CA 78(3):14641g.
Derwent Abstract of JP 62 000 419 (1987).

*Primary Examiner*—Raymond J. Henley, III
*Attorney, Agent, or Firm*—Keil & Weinkauf

[57] ABSTRACT

Disclosed are stable liquid products as consisting essentially of
at least one finely dispersed physiologically tolerated fat-soluble substance as disperse phase;
glycerol or glycerol mixed with water as continuous phase; and
esters of ascorbic acid with long-chain fatty acids as an emulsifier and stabilizer.

3 Claims, No Drawings

STABLE, LIQUID PRODUCTS CONTAINING FAT-SOLUBLE SUBSTANCES

The present invention relates to novel liquid formulations of fat-soluble substances and to a process for producing them. These physiologically tolerated preparations are used, in particular, in liquid human and animal foods.

Fat-soluble physiologically active substances must be dispersible in water and finely divided in order to be readily absorbed by the body. In general, suitable products are produced by emulsifying the substance, which is fat-soluble or dissolved in an edible oil, in an aqueous phase which contains a protective colloid and may additionally contain an emulsifier. The protective colloid envelops the fat-soluble phase, stabilizes the dispersion and is responsible for the required dispersibility in water. The substances frequently used as protective colloids are gelatin, gum arabic, dextrin, starch and other natural substances. It is common to all of them that they are susceptible to microbiological spoilage and can usually be stored over a lengthy period only in dried form unless a preservative is added to the formulation. However, this is unwanted in many cases. This is why dispersion is often followed by a drying step, even when the product is intended for use in a liquid medium and therefore a liquid formulation would be preferable because of the easier incorporation.

One possibility for avoiding microbial spoilage of a product is to add high concentrations of sugar to the aqueous phase. German Patent 2 363 534 describes the production of corresponding sugar-containing liquid vitamin and carotenoid products using physiologically acceptable emulsifiers such as lecithin or ascorbyl palmitate for stabilization. One disadvantage of products of this type is, however, the tendency of the sugar or sugar alcohol to crystallize, e.g. on storage of the product at low temperatures, which results in unwanted inhomogeneities. In addition, good flow properties are not always ensured owing to the high sugar or sugar alcohol content. These disadvantages can be avoided by using as continuous phase a liquid and physiologically acceptable polyalcohol such as glycerol.

European Patent 0 361 928 describes the production of extremely fine-particle emulsions with a glycerol/water mixture as continuous phase, the emulsifiers being phospholipids or non-ionic emulsifiers. The emulsions specified in the examples undergo no change only over a period of 3 months.

Other patents which describe the use of poly-alcohols in carotenoid- or vitamin-containing emulsions depend either on the additional use of an alcohol such as ethanol (JA 47 25 220) or of a non-ionic emulsifier such as polyglycerol fatty acid ester (JP 61 260 860) or of both (JA 62 000 419).

Alcohol and non-ionic emulsifiers are, however, unwanted in many formulations, especially for foodstuffs, or are not generally approved for use in foodstuffs. Japanese Patent 58 128 141 furthermore describes the production of carotenoid emulsions based on glycerol or other polyhydric alcohols and used to fill soft gelatin capsules. The emulsifiers used in the examples are likewise non-ionic emulsifiers, and the relatively low active substance content is to be regarded as another disadvantage.

It is an object of the present invention to propose liquid products which contain fat-soluble substances and which are stable over a long period ($>6$ months) and do not have the stated disadvantages.

We have found that this object is achieved by products containing as essential ingredients
   a) at least one finely dispersed physiotogically tolerated fat-soluble substance as disperse phase
   b) glycerol or glycerol mixed with water as continuous phase using
   c) esters of ascorbic acid with long-chain fatty acids as emulsifier and stabilizer.

Examples of suitable physiologically tolerated fat-soluble substances are the fat-soluble vitamins A. D, E or K, as well as carotenoids such as canthaxanthin, astaxanthin, zeaxanthin, lycopene, apocarotenal and, in particular, $\beta$-carotene. Carotenoids are pigments which occur widely in nature, are present in extremely fine-particle form in many foodstuffs and confer on them a characteristic color. Besides their generally known provitamin A action they are for this reason also of interest as colorings for the human and animal food and pharmaceutical industries. The colorings achieved by high-percentage carotenoid products (e.g. 10% dry powders) as a rule cover the range from orange to red. High-percentage $\beta$-carotene-containing products according to the present invention are, by contrast, distinguished by a brilliant yellow hue as required for many foodstuffs, as well as high coloring power. Also suitable as fat-soluble substances are glycerides of polyunsaturated fatty acids, such as wheat oil, sunflower oil, corn oil etc. or mixtures of said oils. Finally, any fat-soluble substances which play a physiological role in the human or animal body and, because of their insolubility in water, are usually processed to emulsions or water-dispersible powders are very generally suitable as ingredient of the products.

The concentration of the physiologically tolerated fat-soluble substances is usually from 1 to 50%, preferably from 10 to 40% and, in particular, from 20 to 30% of the weight of the products. The intrinsically sparingly soluble $\beta$-carotene is, however, as a rule present in concentrations from 1 to 20%, preferably from 5 to 15% of the weight of the products.

The amount of glycerol is generally from 99 to 50%, preferably from 80 to 60% of the weight of the product, and it is possible to replace the glycerol partially by water in the range of glycerol:water ratios from 100:0 to 50:50 by weight.

Particularly suitable esters of ascorbic, acid are those of $C_{16}$-to $C_{18}$-fatty acids, especially ascorbyl palmitate.

The emulsifying action of ascorbyl palmitate can be further increased by formation of a salt, especially alkali metal salt, as a rule the sodium salty by adding sodium hydroxide solution usually in 0.5 to ! times the molar amount.

Ascorbyl palmitate is a physiologically acceptable emulsifier which is widely used in the human and animal food industries and, moreover, has an antioxidant effect, which increases the stability of carotenoids and many vitamins. The antioxidant effect can, as is known, be further increased by additionally mixing the fat-soluble phase with tocopherol.

The products according to the invention can be produced in a conventional manner, such as by emulsifying the fat phase which contains the active substance in the glycerol phase.

The dispersions have high stability even in aqueous systems such as beverages with an acidic pH Another advantage of the products according to the invention is that they display little turbidity even with a high content of fat-soluble substance, which is required for certain foodstuffs.

The particle sizes in the disperse phase are below 5 μm, in particular below 0.5 μm. For the purposes of the present invention, fat-soluble substances are, in particular, fat-soluble vitamins, e.g. vitamins A, D, E and K, and fats composed of polyunsaturated fatty acids, and carotenoids.

The ratio of the oil phase containing the active substance to the other substances present in the product is, as a rule, from 1:99 to 50:50 and depends on the properties of the fat-soluble substance to be dispersed and on the requirement of uniform and fine distribution.

The novel stable liquid products are outstandingly suitable for straightforward and accurate dosage for addition of, for example, vitamins to liquid human or animal foods or, in the case of β-carotene, for coloring beverages, e.g. fruit-flavored drinks.

EXAMPLE 1

450 g of glycerol are introduced into a 1000 ml beaker, 4.8 g of a 3 molar sodium hydroxide solution are added, and the mixture is heated to 75° C. in a waterbath. 6 g of ascorbyl palmitate are added and then the mixture is stirred with a magnetic stirrer until an almost clear solution results. A homogenizer ( e.g. Ultraturrax ®) is used to emulsify 205 g of D,L-α-tocopheryl acetate in this solution over the course of 5 minutes.

The resulting emulsion is cooled to 30° C. and subsequently homogenized by passing once through a high-pressure homogenizer under 800 bar. The emulsion has a median particle size of 0.2 μm and a tocopheryl acetate content of 30%.

EXAMPLE 2

An emulsion is prepared as described in Example 1 from 480 g of glycerol, 3.2 g of 3 molar sodium hydroxide solution, 4 g of ascorbyl palmitate and 130 g of vitamin A palmitate by initially emulsifying the mixture at 60° C. for 5 minutes. The emulsion is subsequently cooled to 40° C. and homogenized by passing once through a high-pressure homogenizer under 800 bar. This results in an emulsion with a median particle size of 0.3 μm and an active substance content of 20% vitamin A palmitate.

EXAMPLE 3

An emulsion is prepared as described in Example 1 from 450 g of glycerol, 4.8 g of 3 molar sodium hydroxide solution, 6 g of ascorbyl palmirate and 205 g of sunflower oil by initially emulsifying the mixture at 60° C. for 5 minutes. The emulsion is subsequently cooled to 30° C. and homogenized by passing once through a high-pressure homogenizer under 800 bar. This results in an emulsion with a median particle size of 0.3 μm and an oil content of 30%.

EXAMPLE 4 a) 56 g of distilled water and 5.6 g of 3 molar sodium hydroxide solution in a 100 ml beaker are heated to 60° C. in a waterbath. Then 7 g of ascorbyl palmitate are added and the mixture is stirred with a magnetic stirrer until an almost clear solution results.

b) 385 g of glycerol are heated to 60° C. in a waterbath and mixed with the solution prepared in a) by stirring slowly with a magnetic stirrer.

c) 75 g of β-carotene, 5.6 g of α-tocopherol and 166 g of fractionated coconut oil (Miglyol ®810 from Hüls, Troisdorf) are weighed into a 500 ml round-bottomed flask and heated in an oilbath at 185° C., stirring with a paddle stirrer, for 25 minutes, during which the β-carotene dissolves.

d) The solution prepared in c) is emulsified in the solution prepared in b) for 2 minutes using a homogenizer (e.g. Ultraturrax ®). The resulting emulsion is cooled to 50° C. and then homogenized by passing once through a high-pressure homogenizer under 800 bar.

The resulting emulsion has a median particle size of 0.2 μm and a β-carotene content of 10.4%.

We claim:

1. A stable liquid product consisting essentially of:
    a) from 1 to 50% by weight, based on the liquid product, of at least one physiologically tolerated fat-soluble substance selected from vitamin A, D, E or K or derivatives thereof, carotenoids and glycerides of polyunsaturated fatty acids,
    b) from 99 to 50% by weight, based on the product, of glycerol or glycerol/water in the ratio from 100:0 to 50:50, and
    c) from 0.2 to 5% by weight, based on the products, of esters of ascorbic acid with fatty acids of from 16 to 18 carbons.

2. A stable liquid product as defined in claim 1, wherein the physiologically tolerated fat-soluble substances have particle sizes below 5 μm.

3. A stable liquid product as defined in claim 1, wherein the fat-soluble substance selected is a carotenoid which is β-carotene and said β-carotene is present in an amount of from 1–20% by weight, based on the liquid product.

* * * * *